United States Patent [19]

Condon et al.

[11] Patent Number: 5,389,413
[45] Date of Patent: Feb. 14, 1995

[54] THREE DIMENSIONAL SIGNAGE AND A METHOD OF MAKING

[75] Inventors: Robert R. Condon, St. Paul; Daniel P. Pohl, White Bear Lake; Frank T. Sher, St. Paul, all of Minn.

[73] Assignee: Minnesota Mining and Manufacturing Company, St. Paul, Minn.

[21] Appl. No.: 55,187

[22] Filed: Apr. 28, 1993

[51] Int. Cl.$^6$ .................................. B32B 9/00
[52] U.S. Cl. .................................. 428/40; 428/157; 428/161; 428/187; 428/185; 428/203; 428/213; 428/315.5; 428/315.9; 428/331; 156/240; 156/299; 156/556; 40/594; 40/596; 40/615; 40/616
[58] Field of Search .......... 428/195, 40, 203, 157, 428/213, 157, 315.5, 331, 315.9, 187, 156; 40/596, 594, 615, 616; 156/248, 247, 245, 299, 240, 556

[56] References Cited

U.S. PATENT DOCUMENTS

| | | | |
|---|---|---|---|
| 4,052,241 | 10/1977 | Walter | 156/245 |
| 4,230,513 | 10/1980 | Cugini, Sr. et al. | 156/299 |
| 4,295,275 | 10/1981 | Cugini, Sr. et al. | 33/1 G |
| 4,414,731 | 11/1983 | Riemer | 29/453 |
| 4,474,725 | 10/1984 | Sands | 264/510 |
| 4,522,914 | 6/1985 | Brooks, Jr. | 430/320 |
| 4,539,256 | 9/1985 | Shipman | 428/315.5 |
| 4,677,010 | 6/1987 | Selwyn | 428/40 |
| 4,714,581 | 12/1987 | Witt | 264/553 |
| 4,737,224 | 4/1988 | Fabbrini | 156/240 |
| 4,804,572 | 2/1989 | Bobrogi | 428/203 |
| 4,833,172 | 5/1989 | Schwartz et al. | 521/62 |
| 4,837,956 | 6/1989 | Dolence | 428/203 |
| 4,871,992 | 10/1989 | Petersen | 340/407 |
| 4,921,755 | 5/1990 | Carroll, Jr. et al. | 428/328 |
| 4,976,896 | 12/1990 | Short et al. | 264/1.9 |
| 5,000,903 | 3/1991 | Matzinger et al. | 264/511 |
| 5,034,077 | 7/1911 | Pata | 156/84 |
| 5,098,633 | 3/1992 | Hausler | 264/511 |
| 5,152,861 | 10/1992 | Hann | 156/230 |
| 5,162,124 | 11/1992 | Hausler et al. | 425/384 |
| 5,240,539 | 8/1993 | Gunzelman et al. | 156/248 |
| 5,246,757 | 9/1993 | Condon et al. | 428/40 |

OTHER PUBLICATIONS

U.S. application Ser. No. 07/876,057, filed Apr. 1992.
1992 Annual Book of ASTM Standards, "Peel Adhesion of Pressure–Sensitive Tape at 180° Angle", ASTM D 3330–87, vol. 15.09.
3 M Brochure, "Technical Data Safety-Walk Antislip Material" 61-5000-7832-6 RPI.
ASTM Standards, "Designation: D 1044–85", pp. 387–390.
ASTM Standards, "Designation: D 4060–84", pp. 670–672.
Signs of the Times, "Dealing with the ADA", pp. 76–79, Jan. 1992.
Sign Business, "ADA Signage: A New Business Opportunity", pp. 52–73, Feb. 1992.

Primary Examiner—Patrick J. Ryan
Assistant Examiner—Abraham Bahta
Attorney, Agent, or Firm—Gary L. Griswold; Walter N. Kirn; Carolyn V. Peters

[57] ABSTRACT

A 3-D graphic sign construction is provided comprising: (a) a conformed laminate comprising a sign face layer, one or more visual characters, a background color layer, and (b) one or more 3-D characters positioned in register with the visual characters and a method of make the same.

9 Claims, 1 Drawing Sheet

THREE DIMENSIONAL SIGNAGE AND A METHOD OF MAKING

TECHNICAL FIELD

This invention relations to three dimensional signage particularly to three dimensional signage use for display of textural and decorative relief and a method of making architectural signage.

BACKGROUND OF THE INVENTION

Current methods to produce 3-D custom signs includes industrially dedicated technologies such as sandblasting, acid-etching, routing, injection molding, photoemulsion, or thermoforming vacuum molding processes. However, these processes have limitations for sign companies for a variety of reasons including capital investment, required technical expertise, difficulty and expense of a set-up for one-of-kind sign, as well as limitations in design, color, fonts, etc. Some processes, such as acid-etching, injection molding, and vacuum forming require wet chemical, molten processes or very high processing temperatures. Furthermore, process limitations, such as time-consuming and costly tooling and critical registration techniques for font and layout design (injection molding, vacuum forming), require mass produced quantities offering severely restricted design choice (color, font, layout) to the graphic designer.

Other processes that provide some degree of custom color selection typically can require critical registration techniques, or application of abradable or chippable color layers to the sign face. Many of these processes preclude integration of correctly formed Braille dots as a visually appealing part of the sign face.

In vacuum thermoforming processes, both male and female molds are used in the industry. These molds are usually reused for multiple copies. The molds do not become part of the finished sign. While backfilling of the hollow characters with a foam or other liquid resin is possible, most thermoformed signs are backlit and retain hollow characters.

Some processes use a protective overlay film around applied raised graphic characters with minimal air entrapment. While offering the latitude of electronic-cut font generation capabilities, there are limitations in the capabilities to address the visual quality of the cut raised letters, color design selection, hardness, and handling durability. However, there does not presently exist an economic means for providing 3-D signs in limited quantifies or custom designs having a wide latitude of design as for flat signage construction.

Recently, the Federal Government has adopted the Americans with Disabilities Act (ADA) that requires architectural signage in all buildings and places accessible by the public to contain letters, numerals, and Braille characters that are raised off the surface of the sign. The Act specifies that the characters be raised at least 32 mils above their supporting surface, so as to be easily distinguished, even by touch by a disabled person. In addition to complying with the new legislation, the sign should also look aesthetically pleasing and be durable under heavy use conditions.

SUMMARY OF THE INVENTION

Briefly, in one aspect of the present invention a 3-D graphic sign construction is provided comprising:

(a) a conformed laminate comprising in sequence:
(1) a sign face layer,
(2) a first adhesive layer,
(3) one or more visual characters,
(4) a second adhesive layer,
(5) a background color layer, and
(6) a third adhesive layer; and
(b) one or more 3-D characters positioned in register with the visual characters.

In another aspect of the present invention, a process for making the 3-D graphic sign s provided comprising the steps of:

(1) reverse cutting one or more visual alphanumeric and design characters;
(2) weeding and premasking the reverse cut visual characters;
(3) reverse cutting one or more 3-D characters using the same font, style and spacing and with similar dimensions as the visual characters that are to be raised;
(4) weeding and premasking the reverse cut 3-D characters;
(5) adhesively applying the visual characters to a first surface a sign face layer;
(6) removing the premask from the visual characters;
(7) adhesively applying a background color layer over the applied visual characters on the same first surface of the sign face layer as the visual characters effectively sandwiching the visual characters between the sign face layer and the background color layer;
(8) adhesively applying the premasked 3-D characters onto the background film in registration with the outline of the visual characters
(9) removing the premask from the 3-D characters;
(10) positioning the laminate of step 9 onto a vacuum table, wherein the second surface of the sign face layer is away from the surface of the vacuum table and then applying a vacuum to the table; and
(11) applying heat to the laminate, until the background color layer, visual character layer, and sign face layer has conformed around the 3-D characters.

The process of the present invention overcomes many of the limitations of art known systems. The present invention offers a number of improvements and advantages including: (1) font variety afforded by electronic cutters; (2) capability of fine definition, high quality small font sizes (for room signs, etc.); (3) excellent visual quality of characters; and (4) one or few of a kind custom layout capabilities including contrast effects between characters and background formerly associated only with electronic cut generated flat signs. Such contrast effects include: large color selection and color consistency; reflectivity; translucency; metallic effects; marble, wood grain, and other patterns; and different tactile contrasts of three dimensional characters; (5) textured background capabilities; (6) simple, low cost processing equipment; (7) safer, lower processing temperatures that can also allow improved gloss control; (8) very fast processing times as compared to art known methods to fabricate 3-D signs; (9) excellent conformability around 3-D characters with minimal air entrapment; (10) hardness and durability afforded by unitized (uni-construction) plastic sign face; (11) integrated Braille capabilities and Braille dots with desirable tactile qualities; and (12) capabilities to meet ADA requirements.

As used in this application:

"visual characters" refer to alphanumeric or pictorial characters that visually contrast, typically by differential coloration with background;

"3-D characters" refer to alphanumeric or pictorial characters that are cut from a thick, typically rubber filled material and provide the three dimensionality of the visual characters relative to the background;

"raised characters" refers to the alphanumeric or pictorial characters that are raised or recessed on the finished sign face construction, that is, the "raised character" is a laminate of the sign face layer, the visual character, the background color and the 3-D character;

"unitized" refers to the surface rigidity of an entire sign face and raised characters afforded by one piece of material, uni-construction, encased;

"cuttable" refers to the capability of being cut with art known means of cutting vinyl-like or filled rubber like material, such as computer assisted (CAD/CAM) electronic film cutters or hand cutters;

"vertical cut" refers to a cut essentially perpendicular to the surface through the thickness of a thick cuttable film; and "handling durability" refers to the resistance of the 3-D sign to rough handling such as picking or impressing the surface with a fingernail, a pencil or the like.

DESCRIPTION OF THE PREFERRED EMBODIMENT(S)

Figure 1:
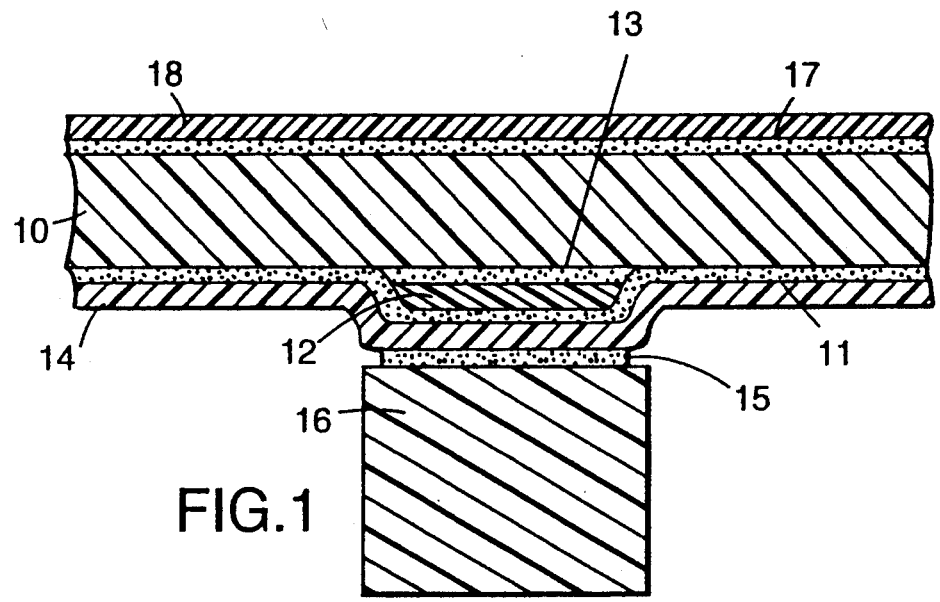
FIG. 1 is a cross-sectional view of a sign face construction with an alphanumeric character of a 3-D sign of the present invention prior to thermally conformed.

Referring now to the drawing, FIG. 1 illustrates a sign face layer (10) having an alphanumeric or pictorial visual character (12) adhesively fastened (adhesive layer 13) and a background color layer (14) adhesively fastened (adhesive layer 11) to the second surface of sign face layer (10). Optionally, surface layer (18) is adhesively fastened (adhesive layer 17) to the first surface of sign face (10). A PSA-backed alphanumeric or pictorial 3-D character (16) is positioned in registration with first cut visual character (12) and adhesively fastened (adhesive layer 15) to the second surface of background color layer (14). The sign face layer (10) and remaining layers (12, 14 and 18) are then thermally conformed around 3-D character (16) to produce the 3-D sign illustrated in FIG. 2.

Figure 2:
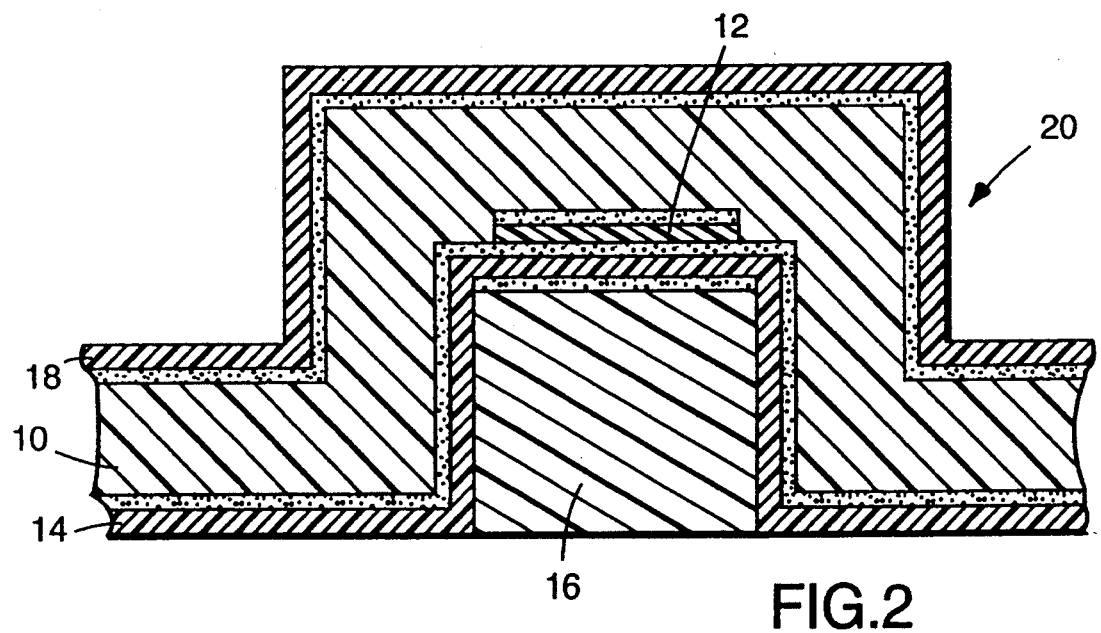
FIG. 2 is a cross-sectional view of the sign face construction with the alphanumeric character of FIG. 1 after thermally conformed.

Although FIGS. 1 and 2 illustrate an adhesive layer between sign face layer 10 and a visual character 12, sign face layer 10 and background color layer 14 and sign face layer 10 and surface modifying layer 18, a visual character and/or background color layer may be screen-printed, painted or otherwise applied to either the first surface of the background color layer or the second surface of the sign face layer.

In a preferred embodiment, sign face layer (10) is semi-rigid or rigid thermoplastic sheeting having a thickness in the range of 1-25 mil (0.03-0.64 mm), preferably 10-20 mil (0.25-0.51 mm) thickness, and provides a rigid and unitized construction of the entire face of the sign. Although a flexible material could be used for some applications, the sign face would not be as durable or retain formed Braille or other formed textures. It is usually transparent in order to see the contrasting color layers below, although it could be colored. It also can provide gloss control by virtue of fillers, surface roughness, or coatings. To make the sign face durable, the thermoplastics typically have a Shore D hardness that is greater than 50, preferably greater than 65 or a Shore C hardness that is greater than 75, preferably greater than 85 . Thermoplastics that soften and conform below about 149° C. (300° F.) afford visually acceptable signs without poor conformation around 3-D characters during moderate temperature of processing (less than about 177° C., 350° F.) or blistering of the materials at high temperatures (greater than about 350° F.). Nonlimiting examples include modified polyesters, polyvinylchloride, cellulose acetate butyrate, polystyrene, and the like.

The visual character (12), (a first color layer) is preferably a conformable film material having a thickness in the range 1-5 mils (0.03-0.13 mm), having an essentially transparent PSA layer and cuttable using an electronic cutter. The material selected should be conformable but should not deteriorate at processing temperatures. Such materials can provide numerous color selection and consistency. Nonlimiting examples include polyvinylchloride such as that commercially available from SCOTCHCAL Series 220. If the first cut visual character is not used, the 3-D characters (16) would be formed without color or contrast differentiation.

The background color layer (14) can be a colored or patterned conformable layer and preferably is coated with an essentially transparent PSA layer. The material may be opaque, translucent, or transparent. Such materials can provide numerous color and pattern selection, as well as consistency. Examples include SCOTCHCAL Series 220, SCOTCHCAL Series 3630 translucent film, DINOC patterned film, and SCOTCHPRINT design films. Alternatively, background color layer (14) could be wet applied ink or paint film such as commercially available as PANAFLEX Paint on Paper Series 820.

The 3-D character layer (16) can be fabricated on an electronic cutter using cuttable PSA-backed film materials having a thickness in the range of 10 to 50 mils (0.25-1.27 mm), wherein the material can withstand the processing temperatures without appearance or structural degradation. Generally, the stroke width to tactile height of the 3-D characters should not exceed 1.4, although this ratio may be variable with the cuttable material used. In the preferred embodiment, the color or appearance of this material is not critical because the second background color layer (14) overlays and hides this layer. Further, many imperfections cut into this character layer may be masked by the laminate layers (10, 12, 14 and 18) conformed around it.

The 3-D character layer functions effectively as a "mold" for the characters, and because the characters remain in the final 3-D sign, the 3-D character "mold" provides reinforcement, strength and durability, that is, the finished 3-D characters are not easily pushed in on themselves. It is contemplated the 3-D character "molds" could be removed after the forming step to afford hollow characters. Such a configuration would not afford the additional strength of the "filled" 3-D characters. A particularly suitable material is a filled rubber material and such nonlimiting examples include 3M "Letterperfect" #511 (45 mil thick) or #521 (35 mil thick) film, and 3M SCOTCHCAL Series 7795 High Profile film (35-40 mil thick).

An optional surface modifying layer (18) is a thermally conformable film layer that when used, is applied prior to thermal processing to conformably shape layers (10, 12 and 14) around the 3-D character layer (16) and can be used to provide a variety of special surface effects. A particularly useful example of such a layer is a PSA-backed vinyl film (1-4 mils, 0.03-0.10 mm), such as 3M SCOTCHCAL 210-314 film. The surface modifying layer (18) can provide durability, dirt and vandal resistance, in addition to modifying the surface of the 3-D sign. The surface modifying layer is conformable under processing conditions and has a thickness in the range of 0.25-15 mils (0.01-0.38 mm), preferably in the range of 0.5-10 mils (0.01-0.25 mm), more preferably in the range of 1-6 mils (0.03-0.15 mm). The surface modifying layer can be transparent, translucent, or opaque. To provide a durable sign face, the optional layer typically has a Shore C or D hardness in the same ranges as the sign face layer. Further, it is often desirable for the overlay film to have a matte finish. Nonlimiting examples of suitable surface modifying layers include vinyl (for example, commercially available from 3M as SCOTCHCAL 3669 or 210-314 film), polyvinylidene fluoride acrylic laminate film, polyethylene, cast polypropylene, cast polystyrene, and the like. Although, adhesive backing films are preferred, fluid coatings may be alternatively applied onto the surface of the sign before or after processing.

The 3-D signage (20) of the present invention is typically laminated using three adhesive layers, and optionally four adhesive layers. All the adhesive layers may or may not be a continuous layer. A first adhesive layer (13) is between sign face layer (10) and visual character layer (12), a second adhesive layer (11) is between the sign face layer (10) and the color background layer (14), and the third adhesive layer (15) is between the color background layer (14) and 3-D character layer (16). The optional adhesive layer (17) is between the sign face layer (10) and the surface modifying layer (18).

Suitable adhesives typically have a 180° peel test strength of 1-6 lb/inch as described in ASTM D 3330-87 (Peel Adhesion of Pressure-Sensitive Tape at 180 Degrees Angle). The preferred adhesives are pressure sensitive adhesives, that is, an adhesive that develops sufficient bonding power by applying only a light pressure. The adhesive systems include pressure sensitive adhesives, thermoplastic (heat activated), cross-linking adhesive system, or other types of adhesive systems to bond the various layers to provide more durability. As described above, an overlay film can be fastened to the base layer using a thermoplastic adhesive bond. Optionally, an adhesion enhancer or primer may be applied to one or both bonding surfaces to enhance adhesion.

Although the preferred embodiment is described using several layers of adhesive-backed conformable sheeting, it is within the scope of the present invention that the visual characters and/or the background color layer may be provided by a paint and mask technique, screen printing process or, using a a color transfer proces with a heat vacuum lamp applicator, such as described in U.S. Pat. No. 4,737,224 (Fabbrini et al.) and the like, with the proviso, the process used to provide the flat graphic sign (pre-conformable sign, that is, layers 10 to 14 inclusive) are such that the 3-D characters can be positioned in register with the visual characters.

METHOD OF CONSTRUCTION

A general process for making a 3-D sign construction is as follows:

(1) reverse cutting the visual alphanumeric and design characters (12) on a computer-assisted (CAD-CAM) electronic cutter such as a Gerber IVA-,IVB, or Supersprint;

(2) weeding and premasking the reverse cut visual characters;

(3) reverse cutting the 3-D characters (16) using the same font and style and with similar dimensions and spacing as the visual characters that are to be raised;

(4) weeding and premasking the reverse cut 3-D characters;

(5) adhesively applying the visual characters to a second surface a sign face layer;

(6) removing the premask;

(7) adhesively applying a background color layer over the applied visual characters on the same back surface of the sign face layer effectively sandwiching the visual characters between the sign face layer and the background color layer;

(8) optionally, adhesively applying a surface modifying layer (18), to the sign face layer on the surface opposite the background color layer effectively sandwiching the sign face layer and the background color layer;

(9) adhesively applying the premasked 3-D characters onto the background film in registration with the outline of the visual characters

(10) removing the premask;

(11) positioning the laminate of step 10 onto a vacuum table, wherein the first surface of the sign face is away from the surface of the vacuum table, and applying a vacuum to the table; and

(12) applying heat up to a temperature of 177° C. to the first surface of the sign face, until the background color layer, visual character layer, sign face layer and optional surface modifying layer has conformed around the 3-D characters.

The background surface of the sign, that is the area other than where the alphanumeric characters are, can be modified by placing a porous (either through- or laterally porous) mat on the vacuum table. The porous mat can be used to modify the surface as well as a processing aid, and is generally not part of the finished 3-D sign. While a vacuum is being pulled on the sign face construction, heat is applied to the front face using, for example, a heat gun. While it is possible to thermally conform a sign face using only 1 to 5 in. Hg, it is generally preferred to use a vacuum of greater than 10 in. Hg. A temperature of 177° C. (350° F.) at the sign face has been found to be useful. Temperatures above about 165° C. (300° F.) tend to degrade the integrity and appearance of the layers, that is, the laminate of the optional surface modifying layer, the sign face layer, the visual character, and the background color layer. The thermal process conforms the softened laminate around the 3-D characters. Generally, the processing time is dependent on a number of factors, including the sign face size, the sign face temperature, the vacuum pressure, the thermoplastic and thickness used for the sign face layer. While the processing times are not set for a specific sign size because of the various factors, the processing times are must faster than other sign fabricating techniques, such as vacuum molding, routing, acid-etching and the like.

In an alternative process version, the sign face can be preheated in a frame under heating elements until the thermoplastic of the laminate softens. The sign is then lowered quickly onto a vacuum table, whereupon a vacuum is immediately applied using a vacuum surge tank. After cooling, the finished 3-D sign construction may be mounted on a sign plate using, for example, transfer adhesive.

Advantageously, cuttable mold or cuttable dry backfill material becomes an integral part of the finished sign construction and provides reinforcement to the 3-D alphanumeric characters. These cuttable molds provide a processing advantage because the molds are cuttable using computer assisted (CAD/CAM) electronic film cutters and the use of the computer-assisted (CAD/CAM) electronic cutter guarantees correct sizing and registration of the visual and 3-D characters. Custom (CAD/CAM) cutting also permits design flexibility in producing the characters, as well as custom logos or designs.

Layout and design flexibility of this system provides numerous variations. Fine dimensional and color definition of small font sizes is readily achieved (unlike vacuum formed signs). By considering the stroke width and the tactile height of the 3-D characters relative to the stroke width of the visual characters to which they are aligned, the visual character may be entirely raised, raised with slopping vertical sides, or flat with a central portion of the strokes raised. The raised dimensions may be adjusted by layering cut characters of different thicknesses. For example, step 9 can be repeated with more than one layer of 50 mil 3-D characters, thereby achieving the raised character dimensions beyond the 50 mils typically obtained with a single layer of thick film material. In another version, recessed characters may be formed. Additionally, Braille can be incorporated directly as an integral part of the unitized sign face (e.g., by placing solid Braille dots or pinheads under the lowest layer prior to thermal processing or by direct embossing after the thermal processing step).

Objects and advantages of this invention are further illustrated by the following examples, but the particular materials and amounts thereof recited in these examples, as well as other conditions and details, should not be construed to unduly limit this invention. All materials are commercially available or known to those skilled in the art unless otherwise stated or apparent.

EXAMPLES

Indent Resistance Test

The sign is placed on an electronic balance (identify), the mass reading tared to zero, and the round shaped end (16 mm diameter) of a 20 mil thick fiat metal stainless steel spatula is pressed vertically onto the raised character of the sign face until a reading of 1500 grams is registered. The length of the indent is microscopically determined. This test creates about a 6.0 mm indent in the unprotected cuttable filled rubber material (3-D character—layer 16) used in the examples.

EXAMPLE 1

A 3-D graphic sign construction with raised characters was prepared. Alphanumeric visual characters having 25 mm font height were cut in reverse from 3 mil PSA-backed colored flexible vinyl film (available from 3M under the trade name SCOTCHCAL 220 Series electronic cutter film) using an electronically addressable vertical cutting Gerber drum cutter. The same entered font data was used for cutting 40 mil PSA-backed filled rubber material (3-D characters) (available from 3M under the trade name "Letterperfect" No. 521). Using a transfer tape (premask), the visual characters were applied to the second surface of 20 mil transparent glycol modified polyethylene terephthalate (PETG) plastic sheet (available from Lustro Plastics Co., Evanston Ill.) using a roll laminator. Then a 3 mil PSA-backed background color film (available from 3M under the trade name SCOTCHCAL 220 Series film) was applied over the second surface of the plastic sheet (sign face layer) and visual characters. The laminate was placed, first surface down, onto a light table, and using a transparent transfer tape, the PSA-backed filled rubber material (3-D characters) was applied onto the exposed background color film in registration with the shadow of the visual characters seen through the colored background film.

Air permeable smooth TAG paper board was placed on a vacuum table, and the laminate was placed, plastic sheet face up (first surface side of the sign face layer was away from the vacuum table), on top of the TAG board. The edges of the laminate were sealed with tape onto the table such that vacuum could be applied under the laminate. With a vacuum gauge reading of about 25 inches of mercury on the vacuum stage, the air exposed side of the laminate was heated with a Master heat gun Model HG501-A at its lower temperature setting. The nozzle of the heat gun was moved in a slow back-and-forth motion about 25 to 50 cm above the laminate to provide sufficient temperature to conform the laminate over and around the sides of the filled rubber material layer (5 to 30 seconds). Using thermal indicating strips in one sign forming process, the sufficient temperature was determined to be around 120° C.

Removal of the processed laminate from the stage afforded a visually appealing glossy unitized color 3-D sign construction with well defined colored characters raised approximately 42 mm above the sign face background surface. The Indent Resistance Test applied to the front face of the sign on top of a raised character created only a slight 0.7 mm scratch. When viewed from the back, the laminate had smoothly conformed around the retained vertical cut sides of the filled rubber material. The cut filled rubber material was pried away from one character of the sign. This sign character was then much less resistant to deformation by hand applied pressure.

EXAMPLES 2–13

Three dimensional sign constructions were made according to the method described in Example 1 using different thermoplastic sheets. All the examples used 35 mil thick PSA-backed filled rubber material for the 3-D characters. A process temperature of about 120° C. was used. The raised characters of the finished sign were evaluated qualitatively for sufficient and uniform conforming of the structural sign face layer and by the Indent Resistance Test.

TABLE 1

| Example | Thermoplastic Sheet | Thickness (mils) | Thermal Conformability | Indent Resistance |
|---|---|---|---|---|
| 2 | rigid PETG[1] | 15 | excellent | slight 1.5 |

TABLE 1-continued

| Example | Thermoplastic Sheet | Thickness (mils) | Thermal Conformability | Indent Resistance |
| --- | --- | --- | --- | --- |
| 3 | rigid PETG | 10 | excellent | mm scratch 3.0 mm |
| 4 | rigid PETG | 5 | excellent | 4.0 mm |
| 5 | rigid APET | 15 | excellent | slight 1.6 mm scratch |
| 6 | rigid APET[2] | 10 | excellent | 2.8 mm |
| 7 | rigid APET | 5 | excellent | 3.6 mm |
| 8 | rigid PVC | 20 | excellent | slight 0.7 mm scratch |
| 9 | rigid PVC[3] | 15 | excellent | slight 0.7 mm scratch |
| 10 | rigid PVC | 10 | excellent | 2.4 mm |
| 11 | flexible PVC | 10 | excellent | 4.6 mm |
| 12 | PET | 4 | poor | 2.8 mm |
| 13 | polycarbonate[4] | 7 | poor | 2.5 mm |

[1]glycol-modified PET commercially available from Lustro Plastics, Inc.
[2]amorphous PET commercially available from Lustro Plastics, Inc.
[3]commercially available from Mark Products
[4]commercially available from GE under the tradename of "Lexan"

EXAMPLE 14

A three dimensional sign was made according to the method of Example 1. A PSA-backed blue translucent background layer was used (available as 3M SCOTCHCAL 3630 Series Marking Film) to form a 3-D sign. When placed in front of a light source, the translucent background was uniformly backlit. In a similar fashion, the 3-D characters could be backed with translucent film and the background color film backed with an opaque film to permit backlit, 3-D characters.

EXAMPLE 15

A three dimensional sign was made according to the method of Example 1. Prior to all of the other steps, a 3 mil PSA-backed matte vinyl film (available as 3M SCOTCHCAL 210-314 film) was applied to the first surface of the thermoplastic sign face layer. After processing, a matte 3-D sign with a 60 degree gloss of 6.4 was formed.

EXAMPLE 16

Three dimensional signs were made according to Example 1 using 35 mil filled rubber material as the 3-D character. Prior to processing, different textured air permeable mats and screens were placed on the vacuum table. After thermal processing of the laminates, visually appealing signs were made having three dimensional surface textures topographically similar to the processing mats or screens on the first surface of the background areas of the sign. For example, a fine screen imparted a crosshatch texture, cloth imparted a fiber-like texture to the background regions, and 3M 100 grit Wetordry TM sandpaper imparted a sandblasted pebble effect.

EXAMPLE 17

Three dimensional signs were made according to Example 1 using 40 mil filled rubber material as the PSA-backed 3-D character. Multiple copies of this material were electronically cut. After application of this material onto the back of the laminate in registration with the outline of the visual character, another layer of this material was applied onto the first layer. In this fashion, multiple layers of the filled rubber material cut characters were applied on top of each other. The laminates were processed as previously described to afford three dimensional signs having characters with different raised character heights above the background of the sign face (Table 2).

TABLE 2

| Number of Applied Layers of Cut 3-D Characters | Three Dimensional Height of Raised Sign Face Characters |
| --- | --- |
| 1 | 45 mils (0.04 in) |
| 2 | 82 mils (0.08 in) |
| 3 | 120 mils (0.12 in) |
| 4 | 156 mils (0.16 in) |

EXAMPLE 18

A three dimensional sign having recessed characters was prepared according to the method of Example 1. The thermoplastic sign face layer was a 15 mil rigid polyvinylchloride. In this process, the 3-D characters from the PSA-backed filled rubber material were removed, and the remaining sheet of the cut filled rubber material was aligned with the shadow of the visual characters seen through the background film. In this sign, the visual background was the raised surface and was reinforced by the filled rubber material layer.

EXAMPLE 19

A three dimensional sign was made according to Example 16. The background color layer was applied onto 15 mil thermoplastic sign face layer as a sprayed black enamel lacquer (Sprayon Industrial Acrylic Enamel) and air dried. A fine mesh screen was used on the vacuum table. After processing, the background of the finished sign had a black-filled screen-like appearance.

Various modifications and alterations of this invention will become apparent to those skilled in the art without departing from the scope and principles of this invention, and it should be understood that this invention is not to be unduly limited to the illustrative embodiments set forth hereinabove. All publications and patents are herein incorporated by reference to the same extent as if each individual publication or patent was specifically and individually indicated to be incorporated by reference.

We claim:

1. 3-D sign face construction comprising:
   (a) a conformed laminate comprising in sequence:
   (1) a sign face layer, wherein the sign face layer is a semi-rigid or rigid conformable thermoplastic sheeting,
   (2) a first adhesive layer,
   (3) one or more visual characters, wherein the visual characters are cut from a cuttable conformable material having a thickness in the range of 1-5 mils;
   (4) a second adhesive layer,
   (5) a background color layer, wherein the background color layer is conformable material; and
   (6) a third adhesive layer; and
   (b) one or more 3-D characters positioned in register with the visual characters, wherein the 3-D characters are cut from a cuttable material having a thickness in the range of 10-50 mils.

2. The 3-D sign face construction according to claim 1 further including a surface modifying layer and a fourth adhesive layer laminated to the sign face layer on the surface opposite the first adhesive layer.

3. The 3-D sign face construction according to claim 1, wherein the sign face layer is a rigid or semi-rigid thermoplastic that softens and conforms below 121° C.

4. The 3-D sign face construction according to claim 1, wherein the background color layer is a colored or patterned conformable layer.

5. The 3-D sign face construction according to claim 1, wherein the cuttable material is a filled rubber material.

6. The 3-D sign face construction according to claim 1, wherein the first, second and third adhesive layers are a pressure sensitive adhesive have a 180° peel test strength of 1 to 6 lb/inch as described in ASTM D 3330-87.

7. A 3-D sign face construction comprising:
   (a) a conformed laminate comprising in sequence:
   (1) a sign face layer, wherein the sign face layer is a semi-rigid or rigid conformable thermoplastic sheeting;
   (2) a first adhesive layer,
   (3) a background color layer printed with one or more visual characters, wherein the background color layer is conformable material, and
   (4) a second adhesive layer; and
   (b) one or more 3-D characters positioned in register with the visual characters, wherein the 3-D characters are cut from a cuttable material having a thickness in the range of 10–50 mils.

8. The 3-D sign face construction according to claim 7 further including a surface modifying layer and a fourth adhesive layer laminated to the sign face layer on the surface opposite the first adhesive layer.

9. The 3-D sign face construction according to claim 7 wherein the sign face layer is a rigid or semi-rigid thermoplastic that softens and conforms below 121° C.

* * * * *